(12) United States Patent
Finn et al.

(10) Patent No.: US 10,733,006 B2
(45) Date of Patent: Aug. 4, 2020

(54) VIRTUAL COMPUTING SYSTEMS INCLUDING IP ADDRESS ASSIGNMENT USING EXPRESSION EVALUATION

(71) Applicant: Nutanix, Inc., San Jose, CA (US)

(72) Inventors: Brian Finn, South Lake Tahoe, CA (US); Jan Olderdissen, Herrenberg (DE); Shane Chu, San Jose, CA (US); YJ Yang, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 135 days.

(21) Appl. No.: 15/846,872

(22) Filed: Dec. 19, 2017

(65) Prior Publication Data

US 2019/0188021 A1    Jun. 20, 2019

(51) Int. Cl.
*G06F 9/455* (2018.01)
*H04L 29/12* (2006.01)

(52) U.S. Cl.
CPC ...... *G06F 9/45558* (2013.01); *H04L 61/2007* (2013.01); *H04L 61/2061* (2013.01); *G06F 2009/45595* (2013.01); *H04L 61/6018* (2013.01)

(58) Field of Classification Search
CPC ....... G06F 9/45558; G06F 2009/45595; H04L 61/2007; H04L 61/6018; H04L 61/2061
See application file for complete search history.

(56) References Cited

U.S. PATENT DOCUMENTS

| | | | |
|---|---|---|---|
| 6,633,538 B1 | 10/2003 | Tanaka et al. | |
| 7,743,208 B2 | 6/2010 | Yoshida et al. | |
| 7,818,408 B1 | 10/2010 | Ignatuk et al. | |
| 8,549,518 B1 | 10/2013 | Aron et al. | |
| 8,601,473 B1 | 12/2013 | Aron et al. | |
| 8,850,130 B1 | 9/2014 | Aron et al. | |
| 9,772,866 B1 | 9/2017 | Aron et al. | |
| 2008/0104273 A1 | 5/2008 | Bruck et al. | |
| 2010/0115070 A1 | 5/2010 | Missimilly | |
| 2010/0146121 A1 | 6/2010 | Schwimer | |
| 2011/0004680 A1* | 1/2011 | Ryman | H04L 67/025 709/224 |

(Continued)

FOREIGN PATENT DOCUMENTS

CN    107818104 A    3/2018

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Meng Ai T An
*Assistant Examiner* — Michael W Ayers
(74) *Attorney, Agent, or Firm* — Dorsey & Whitney LLP

(57) ABSTRACT

Examples described herein may include virtualized environments having multiple computing nodes accessing a storage pool. User interfaces are described which may allow a user to enter one or more IP address generation formula for various components of computing nodes. Examples of system described herein may evaluate the IP address generation formula(s) to generate a set of IP addresses that may be assigned to computing nodes in the system. This may advantageously allow for systematic and efficient assigning of IP addresses across large numbers of computing nodes.

20 Claims, 3 Drawing Sheets

(56) References Cited

U.S. PATENT DOCUMENTS

| | | | |
|---|---|---|---|
| 2011/0173541 A1* | 7/2011 | Carlson | H04L 67/36 |
| | | | 715/735 |
| 2012/0158806 A1 | 6/2012 | Snyder et al. | |
| 2013/0132948 A1* | 5/2013 | Hari | G06F 9/45558 |
| | | | 718/1 |
| 2013/0290563 A1* | 10/2013 | Fleischman | H04L 61/1511 |
| | | | 709/245 |
| 2014/0122671 A1 | 5/2014 | Bozga et al. | |
| 2015/0040238 A1* | 2/2015 | Sarsa Sarsa | H04L 61/2539 |
| | | | 726/26 |
| 2015/0195178 A1* | 7/2015 | Bhattacharya | H04L 45/745 |
| | | | 718/1 |
| 2015/0280996 A1* | 10/2015 | Berube | H04L 41/12 |
| | | | 709/224 |
| 2015/0326531 A1 | 11/2015 | Cui et al. | |
| 2016/0203008 A1* | 7/2016 | Cui | G06F 9/455 |
| | | | 718/1 |
| 2016/0323311 A1 | 11/2016 | Kumar | |
| 2018/0048716 A1* | 2/2018 | Madhayyan | H04L 61/2015 |
| 2019/0166108 A1 | 5/2019 | Larson et al. | |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Cano, Ignacio et al. "Curator: Self-Managing Storage for Enterprise Clusters"; University of Washington; published Mar. 2017; pp. all.

* cited by examiner

| 202 BLOCK | 204 NODE | 206 IPMI IP FORMULA1 214 | 208 HYPERVISOR IP FORMULA2 216 | 210 CVM IP FORMULA3 218 | 212 HYPERVISOR HOSTNAME AUTOFILL HERE |
|---|---|---|---|---|---|
| 14SM36030032 NX-3060 220 | A | IP#1 | ... | ... | x |
|  | B | IP#2 | ... | ... | x |
|  | C | IP#3 | ... | ... | x |
| 15SM63310032 NX-6035C 222 | A | IP#4 | ... | ... | x |
|  | B | IP#5 | ... | ... | x |

5 NODES WERE DISCOVERED USING IPv6 L2 MULTICAST    RETRY    TROUBLESHOOT

REORDER BLOCKS

FIG. 2

VIRTUAL COMPUTING SYSTEMS INCLUDING IP ADDRESS ASSIGNMENT USING EXPRESSION EVALUATION

TECHNICAL FIELD

Embodiments described herein relate generally to virtual computing systems, and examples of systems are described which may facilitate assignment of IP addresses to computing nodes of clusters.

BACKGROUND

A virtual machine (VM) generally refers to a software-based implementation of a machine in a virtualization environment, in which the hardware resources of a physical computer (e.g., CPU, memory, etc.) are virtualized or transformed into the underlying support for the fully functional virtual machine that can run its own operating system and applications on the underlying physical resources just like a real computer.

Virtualization generally works by inserting a thin layer of software directly on the computer hardware or on a host operating system. This layer of software contains a virtual machine monitor or "hypervisor" that allocates hardware resources dynamically and transparently. Multiple operating systems may run concurrently on a single physical computer and share hardware resources with each other. By encapsulating an entire machine, including CPU, memory, operating system, and network devices, a virtual machine may be completely compatible with most standard operating systems, applications, and device drivers. Most modern implementations allow several operating systems and applications to safely run at the same time on a single computer, with each having access to the resources it needs when it needs them.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine may not be utilized to perform useful work. This may be wasteful and inefficient if there are users on other physical machines which are currently waiting for computing resources. Virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

A virtualization environment (e.g., a distributed computing cluster) may often include dozens or hundreds of nodes, each of which may have multiple Internet protocol (IP) addresses. Given the large number of nodes, it may be difficult or cumbersome to manually assign all the IP addresses to be used by the nodes. Manual entry of the IP addresses may be cumbersome. Providing a specific API or script to allocate the IP addresses may be unnecessarily complex.

BRIEF DESCRIPTION OF THE DRAWINGS

FIG. 2 is a schematic illustration of a user interface arranged in accordance with examples described herein.

DETAILED DESCRIPTION

Certain details are set forth herein to provide an understanding of described embodiments of technology. However, other examples may be practiced without various of these particular details. In some instances, well-known computer system components, circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

Figure 1:
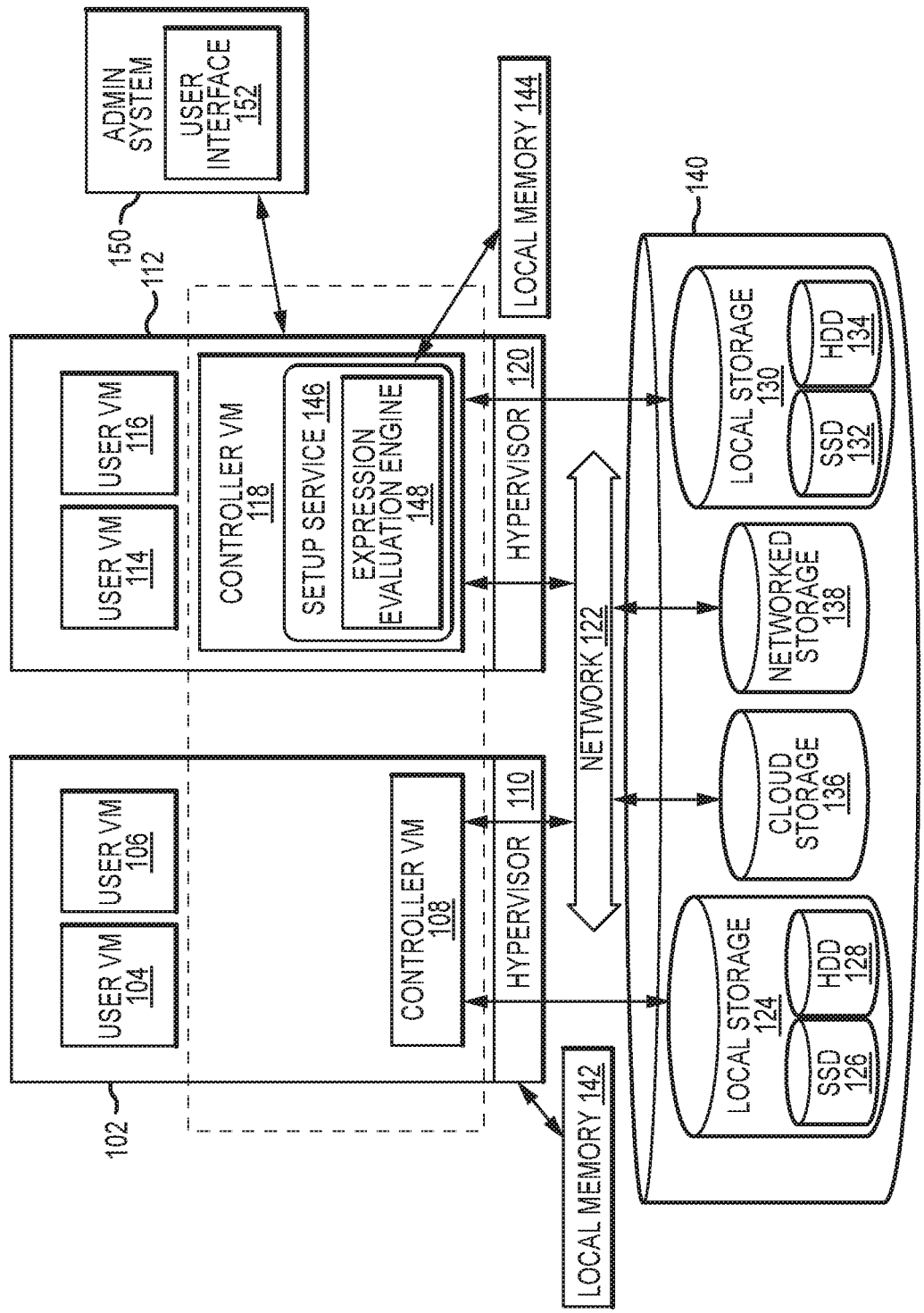
FIG. 1 is a block diagram of a distributed computing system, in accordance with an embodiment of the present invention.

FIG. 1 is a block diagram of a distributed computing system, in accordance with an embodiment of the present invention. The distributed computing system of FIG. 1 generally includes computing node 102 and computing node 112 and storage 140 connected to a network 122. The network 122 may be any type of network capable of routing data transmissions from one network device (e.g., computing node 102, computing node 112, and storage 140) to another. For example, the network 122 may be a local area network (LAN), wide area network (WAN), intranet, Internet, or a combination thereof. The network 122 may be a wired network, a wireless network, or a combination thereof.

The storage 140 may be a storage pool which may include local storage 124, local storage 130, cloud storage 136, and/or networked storage 138. The local storage 124 may include, for example, one or more solid state drives (SSD 126) and one or more hard disk drives (HDD 128). Similarly, local storage 130 may include SSD 132 and HDD 134. Local storage 124 and local storage 130 may be directly coupled to, included in, and/or accessible by a respective computing node 102 and/or computing node 112 without communicating via the network 122. Cloud storage 136 may include one or more storage servers that may be stored remotely to the computing node 102 and/or computing node 112 and accessed via the network 122. The cloud storage 136 may generally include any type of storage device, such as HDDs SSDs, or optical drives. Networked storage 138 may include one or more storage devices coupled to and accessed via the network 122. The networked storage 138 may generally include any type of storage device, such as HDDs SSDs, or optical drives. In various embodiments, the networked storage 138 may be a storage area network (SAN). The computing node 102 is a computing device for hosting VMs in the distributed computing system of FIG. 1. The computing node 102 may be, for example, a server computer, a laptop computer, a desktop computer, a tablet computer, a smart phone, or any other type of computing device. The computing node 102 may include one or more physical computing components, such as processors.

The computing node 102 is configured to execute a hypervisor 110, a controller VM 108 and one or more user VMs, such as user VMs 104, 106. The user VMs including user VM 104 and user VM 106 are virtual machine instances executing on the computing node 102. The user VMs including user VM 104 and user VM 106 may share a virtualized pool of physical computing resources such as physical processors and storage (e.g., storage 140). The user VMs including user VM 104 and user VM 106 may each have their own operating system, such as Windows or Linux.

While a certain number of user VMs are shown, generally any number may be implemented. User VMs may generally be provided to execute any number of applications which may be desired by a user.

The hypervisor 110 may be any type of hypervisor. For example, the hypervisor 110 may be ESX, ESX(i), Hyper-V, KVM, or any other type of hypervisor. The hypervisor 110 manages the allocation of physical resources (such as storage 140 and physical processors) to VMs (e.g., user VM 104, user VM 106, and controller VM 108) and performs various VM related operations, such as creating new VMs and cloning existing VMs. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API.

Controller VMs (CVMs) described herein, such as the controller VM 108 and/or controller VM 118, may provide services for the user VMs in the computing node. As an example of functionality that a controller VM may provide, the controller VM 108 may provide virtualization of the storage 140. Controller VMs may provide management of the distributed computing system shown in FIG. 1. Examples of controller VMs may execute a variety of software and/or may serve the I/O operations for the hypervisor and VMs running on that node. In some examples, a SCSI controller, which may manage SSD and/or HDD devices described herein, may be directly passed to the CVM, e.g., leveraging VM-Direct Path. In the case of Hyper-V, the storage devices may be passed through to the CVM.

The computing node 112 may include user VM 114, user VM 116, a controller VM 118, and a hypervisor 120. The user VM 114, user VM 116, the controller VM 118, and the hypervisor 120 may be implemented similarly to analogous components described above with respect to the computing node 102. For example, the user VM 114 and user VM 116 may be implemented as described above with respect to the user VM 104 and user VM 106. The controller VM 118 may be implemented as described above with respect to controller VM 108. The hypervisor 120 may be implemented as described above with respect to the hypervisor 110. In the embodiment of FIG. 1, the hypervisor 120 may be a different type of hypervisor than the hypervisor 110. For example, the hypervisor 120 may be Hyper-V, while the hypervisor 110 may be ESX(i).

The controller VM 108 and controller VM 118 may communicate with one another via the network 122. By linking the controller VM 108 and controller VM 118 together via the network 122, a distributed network of computing nodes including computing node 102 and computing node 112, can be created.

Controller VMs, such as controller VM 108 and controller VM 118, may each execute a variety of services and may coordinate, for example, through communication over network 122. Services running on controller VMs may utilize an amount of local memory to support their operations. For example, services running on controller VM 108 may utilize memory in local memory 142. Services running on controller VM 118 may utilize memory in local memory 144. The local memory 142 and local memory 144 may be shared by VMs on computing node 102 and computing node 112, respectively, and the use of local memory 142 and/or local memory 144 may be controlled by hypervisor 110 and hypervisor 120, respectively. Moreover, multiple instances of the same service may be running throughout the distributed system—e.g. a same services stack may be operating on each controller VM. For example, an instance of a service may be running on controller VM 108 and a second instance of the service may be running on controller VM 118.

Generally, controller VMs described herein, such as controller VM 108 and controller VM 118 may be employed to control and manage any type of storage device, including all those shown in storage 140 of FIG. 1, including local storage 124 (e.g., SSD 126 and HDD 128), cloud storage 136, and networked storage 138. Controller VMs described herein may implement storage controller logic and may virtualize all storage hardware as one global resource pool (e.g., storage 140) that may provide reliability, availability, and performance. IP-based requests are generally used (e.g., by user VMs described herein) to send I/O requests to the controller VMs. For example, user VM 104 and user VM 106 may send storage requests to controller VM 108 using an IP request. Controller VMs described herein, such as controller VM 108, may directly implement storage and I/O optimizations within the direct data access path.

Note that controller VMs are provided as virtual machines utilizing hypervisors described herein—for example, the controller VM 108 is provided behind hypervisor 110. Since the controller VMs run "above" the hypervisors examples described herein may be implemented within any virtual machine architecture, since the controller VMs may be used in conjunction with generally any hypervisor from any virtualization vendor.

Virtual disks (vDisks) may be structured from the storage devices in storage 140, as described herein. A vDisk generally refers to the storage abstraction that may be exposed by a controller VM to be used by a user VM. In some examples, the vDisk may be exposed via iSCSI ("internet small computer system interface") or NFS ("network file system") and may be mounted as a virtual disk on the user VM. For example, the controller VM 108 may expose one or more vDisks of the storage 140 and may mount a vDisk on one or more user VMs, such as user VM 104 and/or user VM 106.

During operation, user VMs (e.g., user VM 104 and/or user VM 106) may provide storage input/output (I/O) requests to controller VMs (e.g., controller VM 108 and/or hypervisor 110). Accordingly, a user VM may provide an I/O request to a controller VM as an iSCSI and/or NFS request. Internet Small Computer system Interface (iSCSI) generally refers to an IP-based storage networking standard for linking data storage facilities together. By carrying SCSI commands over IP networks, iSCSI can be used to facilitate data transfers over intranets and to manage storage over any suitable type of network or the Internet. The iSCSI protocol allows iSCSI initiators to send SCSI commands to iSCSI targets at remote locations over a network. In some examples, user VMs may send I/O requests to controller VMs in the form of NFS requests. Network File system (NFS) refers to an IP-based file access standard in which NFS clients send file-based requests to NFS servers via a proxy folder (directory) called "mount point". Generally, then, examples of systems described herein may utilize an IP-based protocol (e.g., iSCSI and/or NFS) to communicate between hypervisors and controller VMs.

During operation, user VMs described herein may provide storage requests using an IP based protocol. The storage requests may designate the IP address for a controller VM from which the user VM desires I/O services. The storage request may be provided from the user VM to a virtual switch within a hypervisor to be routed to the correct destination. For examples, the user VM 104 may provide a storage request to hypervisor 110. The storage request may request I/O services from controller VM 108 and/or controller VM 118. If the request is to be intended to be handled by a controller VM in a same service node as the user VM (e.g., controller VM 108 in the same computing node as user VM 104) then the storage request may be internally routed within computing node 102 to the controller VM 108. In some examples, the storage request may be directed to a controller VM on another computing node. Accordingly, the hypervisor (e.g., hypervisor 110) may provide the storage request to a physical switch to be sent over a network (e.g., network 122) to another computing node running the requested controller VM (e.g., computing node 112 running controller VM 118).

Accordingly, controller VMs described herein may manage I/O requests between user VMs in a system and a storage pool. Controller VMs may virtualize I/O access to hardware resources within a storage pool according to examples described herein. In this manner, a separate and dedicated controller (e.g., controller VM) may be provided for each and every computing node within a virtualized computing system (e.g., a cluster of computing nodes that run hypervisor virtualization software), since each computing node may include its own controller VM. Each new computing node in the system may include a controller VM to share in the overall workload of the system to handle storage tasks. Therefore, examples described herein may be advantageously scalable, and may provide advantages over approaches that have a limited number of controllers. Consequently, examples described herein may provide a massively-parallel storage architecture that scales as and when hypervisor computing nodes are added to the system.

Examples of controller VMs described herein may include a setup service. For example, controller VM 118 may include (e.g., run) setup service 146. The setup service may be implemented using software which is executed by a controller VM. Setup services described herein may discover and configure one or more computing nodes of a distributed, virtualized computing system described herein. For example, when computing node 102 and/or computing node 112 are initially started, the computing nodes may not be configured to communicate with one another and/or with storage 140. The setup service 146 may discover the computing nodes in the system. For example, the setup service 146 may provide a query, e.g., over network 122, to prompt responses from computing nodes in the distributed system. By receiving a response from one or more computing nodes the setup service 146 may discover the computing nodes. The setup service 146 may configure the computing nodes in the system. For example, the setup service 146 may assign IP addresses to one or more computing nodes in the system for use in communicating with one another, with their respective hypervisors, and/or with other components. The IP addresses may be assigned from a set of IP addresses available to the setup service 146. The setup service 146 may additionally or instead provide other types of configuration data to computing nodes in the system. The setup service 146 may additionally or instead in some examples image one or more computing nodes (e.g., install software, copy and/or clone software, such as for disaster recovery).

Examples of setup services described herein, such as setup service 146 of FIG. 1 may include an expression evaluation engine, such as expression evaluation engine 148 of FIG. 1. The expression evaluation engine 148 may be implemented, for example, using logic, firmware, and/or software. For example, the setup service 146 may include executable instructions for performing actions described herein with reference to the expression evaluation engine 148. The expression evaluation engine 148 may evaluate one or more received expressions (e.g., formulae, such as an IP address generation formula) described herein. The setup service 146 may generate IP addresses based on the evaluation of the received expressions. In this manner, the setup service 146 may provide a set of IP addresses generated in accordance with one or more expressions provided (e.g., by a user). The set of IP addresses may be used by the setup service 146 to assign IP addresses to computing nodes in a system.

Examples of systems described herein may include one or more administrator systems, such as admin system 150 of FIG. 1. The administrator system may be implemented using one or more computing systems, such as a server, computer, laptop, desktop, tablet, mobile phone, etc. For example, an administrator system may include one or more processing units (e.g., processors) and memory encoded with executable instructions for performing actions described herein with regard to the administrator system. In some examples, administrator systems described herein may be configured (e.g., programmed) to provide a user interface, such as user interface 152 of FIG. 1. The user interface may, for example, provide output for a user by displaying data on a display of the admin system 150, and/or providing auditory, vibratory, and/or other visual output. Administrator systems described herein, such as admin system 150 may include one or more input devices, such as keyboards, mice, touchscreens, and/or speakers, to receive input from a user. The administrator system may be in communication with one or more computing nodes of a distributed computing system using a wired and/or wireless connection. For example, the admin system 150 may be in communication with computing node 112 (e.g., with controller VM 118) over a network such as network 122.

Accordingly, examples of user interfaces described herein, such as user interface 152 of FIG. 1, may be used to input one or more expressions (e.g., IP address generation formula). The input expressions may be evaluated by expression evaluation engines described herein (e.g., expression evaluation engine 148 of FIG. 1) to generate a set of IP addresses. Setup services described herein, such as setup service 146 may utilize the set of IP addresses to assign IP addresses to computing nodes and/or components of computing nodes described herein. In this manner, users (e.g., system administrators) may provide formulaic input that may advantageously allow for automated calculation of a pool of IP addresses to be used in a distributed system.

In some examples, IP address generation formulae described herein may include one or more variables associated with each computing node in a system. For example, the formula may contain a variable which may have a particular value for each computing node in the system. Examples of expression evaluation engines described herein may evaluate the variable for each of the computing nodes to provide a numerical value used in the formula to generate an IP address for that node. In some examples, a variable used may be associated with a physical position of each of the multiple computing nodes. Examples of variables which may be used include, but are not limited to, a node position, a block number, a node number, a rack ID, a slot height, or combinations thereof.

For example, computing nodes described herein may physically be positioned within a chassis. Referring to FIG. 1, for example, the computing node 102 may be housed in a chassis while the computing node 112 may be housed in another chassis. In some examples, multiple computing nodes may be housed in a same chassis. The computing node 102 and computing node 112 may accordingly in some examples be housed in a same chassis. A distributed system (e.g., a virtualized environment and/or a cluster) may include multiple chassis. The multiple chassis may be stored in racks, with each rack having numerous slots, and each slot sized to support a chassis. Node position may accordingly refer to a position (e.g., a numbering) of a computing node within a chassis. Block number may refer to a block in which the computing node is located. Generally, a block may include multiple nodes. Each node may refer to, for example, a complete set of hardware (e.g., a server). Node number may refer to a number (e.g., an ID) associated with a computing node. For example, computing nodes in a system may each be associated with a unique number (e.g., an ID). In some examples, the node number may refer to a number associated with the computing node within the block. For example, the node number may only uniquely identify the node within the block, and the number may be reused in other blocks for different nodes. Rack ID may refer to a number (e.g., an ID) associated with a rack supporting one or more chassis. For example, racks in a data center or other computing system storage location may be each associated with a unique number (e.g., an ID). Slot height may refer to a number of a slot supporting a chassis containing a particular computing node. For example, slots in a rack may each be associated with a unique number (e.g., an ID). In some examples, the unique number may be allocated consecutively from a lowest slot on up the rack, or vice versa. Accordingly, the ID of the slot may also be associated with a physical height of the slot in the rack.

In some examples, each computing node in a system described herein may be associated with multiple IP addresses. For example, the computing node 102 and/or the computing node 112 may be associated with multiple IP addresses. Different components of a computing node, for example, may be associated with one or more respective IP addresses. Accordingly, setup services described herein may in some examples assign multiple IP addresses to each computing node in a system. In some examples, certain ones (e.g., each) of the multiple IP addresses may pertain to a different component of the computing node. In some examples, a computing node may utilize an IP address for a controller VM of the computing node (e.g., controller VM 108). In some examples, a computing node may utilize multiple IP addresses for a controller VM. For example, computing nodes may segment network traffic in accordance with one or more parameters (e.g., storage traffic and data traffic). Accordingly, the controller VM may utilize one IP address for one type of traffic and another IP address for another type of traffic. Any number of IP addresses may be so used by a controller VM. In some examples, a computing node may use an IP address for a hypervisor of the computing node (e.g., hypervisor 110). In some examples, a computing node may use an IP address for a baseboard management controller associated with the computing node. The baseboard management controller (BMC) may generally refer to a controller which may be included in a motherboard of the computing node in some examples. IP addresses may additionally or instead be associated with other components of a computing node (e.g., other components on a motherboard, sensors, other VMs, etc.). Referring to computing node 102, for example, the computing node 102 may be associated with three IP addresses—one IP address for controller VM 108, one IP address for hypervisor 110, and one IP address for a BMC of the computing node 102. Accordingly, setup services described herein may assign multiple IP addresses to each computing node in a system in some examples. In some examples, users may provide multiple IP address generation formulae, e.g., using a user interface, such as user interface 152 of FIG. 1. Each IP address generation formula may pertain to a different component of the computing nodes. For example, one IP address generation formula may be provided to generate IP addresses to assign to controller VMs. Another IP address generation formula may be provided to generate IP addresses to assign to hypervisors. Another IP address generation formula may be provided to generate IP addresses to assign to BMCs.

IP address formulas described herein may take a variety of forms and/or formats, and any of a variety of IP addresses may be accommodated, including IPv4 and IPv6 IP addresses. An IPv4 IP address may generally refer to a 32-bit number. The 32-bit number is typically written as a set of four eight-bit numbers—e.g., A.B.C.D, where A, B, C, and D, may each be a numerical value of up to eight bits. Each of the four eight-bit numbers may be delineated by a period ".". An IPv6 IP address may generally refer to an 128 bit number. Example of IPv6 IP addresses include a representation of eight groups of four hexadecimal digits with the groups being separated by colons. For example, A:B:C:D:E:F:G:H, where each of A,B,C,D,E,F,G, and H represent numerical values having up to four hexadecimal digits. Each of the groupings—e.g., each of the four eight-bit numbers of IPv4 and/or each of the eight groups of four hexadecimal digits of IPv6—may be referred to as a word or byte boundary. In some examples, IP address generation formulas described herein may include different expressions for certain ones (e.g., each) of the bit boundaries. For example, four IP address generation formulas may be used in some examples to generate a IPv4 IP address—one for each of the four eight-bit numbers. Eight IP address generation formulas may be used in some examples to generate an IPv6 IP address—one for each of the eight groups for four hexadecimal digits. In some examples, however, a single expression may be used which may evaluate to a numerical value that may be translated into multiple bit boundaries of an IP address. For example, the IP address generation formula may be evaluated to an integer that may be interpreted (e.g., by a setup service) as a 32 bit IP address. For example, if the formula evaluates to a value of 1, the resulting IP address determined by the setup service may be 0.0.0.1. If the formula value is 258, the IP address may be 0.0.1.2, etc. In this manner, components of the formula may cross byte components (e.g., byte boundaries) of the resulting calculated IP address.

IP address formulas described herein may utilize a variety of operators, including but not limited to, a bit shift operator, a mathematical operator, or combinations thereof. Mathematical operators may include, for example, an addition operator, a subtraction operator, a multiplication operator, and/or a divisional operator (e.g., +, −,*, and/or/).

In some examples, the following variables may be supported for use in an IP address generation formula:
  p=node position; this may be a zero based number (e.g., starting from node position 0)
  b=block number; this may be a zero based block number (e.g., starting from block number 0)
  n=node number; this may be a zero based number (e.g., starting from node number 0)
  r=rack ID; this may be a zero based number (e.g., starting from rack ID 0)

u=rack height (e.g., U height); this may be a zero based number (e.g., starting from rack height 0)

In some examples, the following operators may be supported for use in an IP address generation formula:
basic math: +(e.g., addition), −(e.g., subtraction),*(e.g., multiplication),/(e.g., division)
bit shift operators: <<(e.g., shift left), >> (e.g., shift right)
bit arithmetic: & (e.g., AND), |(e.g., OR)
parenthesis: ( )

In other examples, additional, fewer, and/or different variables and/or operators may be supported.

An example IP address generation formula may be written as $$(10<<24)+n*3+2$$

This formula specifies that the value 10 will first be shifted 24 bits to the left. This results in IP addresses beginning 10.X.X.X. To this, the node number n will be multiplied by 3 and two will be added to the product. Accordingly, for n=1, the value of the above formula will be 167772165 (e.g., as evaluated by expression evaluation engine 148). The numerical value may be resolved to 10.0.0.5 (e.g., by setup service 146). In this manner, an expression engine and/or setup service described herein may evaluate the above formula for each of multiple nodes (each having a different node number n) in a system. The resulting IP addresses provided by the setup service may include 10.0.0.2 (associated with node 0), 10.0.0.5 (associated with node 1), 10.0.0.8 (associated with node 2), etc.

Another example IP address generation formula may be written as $$(10<<24)+(b<<8)+p*3+2$$

This formula specifies that the value 10 will first be shifted 24 bits to the left. This results in IP addresses beginning 10.X.X.X. The block number b will be shifted 8 bits to the left and added. A node position may be multiplied by three and two may be added to the product. The sum may be added to the sum of the shifted bit sequences.

For block position 0 and node position 0, the above expression may be evaluated to numerical value 167772162, which may be translated (e.g., by setup service 146) to 10.0.0.2. For node position 1 and block position 0, the above expression may be evaluated to numerical value 167772418, which may be translated to 10.0.1.2. Accordingly, a set of IP addresses which may be generated using the expression may include 10.0.0.2 (block position 0, node position 0), 10.0.1.2 (block position 1, node position 0), 10.0.0.5 (block position 0, node position 1), 10.0.0.1.5 (block position 1, node position 1), etc. Accordingly, the setup service 146 may assign 10.0.0.2 to a computing node at block position 0 and node position 0. The setup service 146 may assign 10.0.1.2 to a computing node at block position 1, node position 0, etc.

In some examples, multiple expressions may be provided in an IP address generation formula (e.g., multiple IP address generation formulas may be used to generate a single IP address). For example, a formula (e.g., expression) may be used for each byte boundary.

For example, a user may enter an IP address generation formula having the following format:
Format is =<expression1>.<expression2>.<expression3>.<expression4>

Each expression may utilize the variables and/or operators described herein. For example, an IP address generation formula may be entered as:

$$10.0.0.n*3+2$$

Note that numerical values may be entered when the values are not intended to change based on variables. Accordingly, the above formula would yield 10.0.0.2 (for node number 0), 10.0.0.5 (for node number 1), etc. In some examples, expression evaluation engines and/or setup services described herein may apply a carry bit to a next byte group to allow IP address generation formulas having an expression per byte to nonetheless cross byte boundaries. For example, for node 100, the above formula would evaluate numerically to 10.0.0.302. Note that 256 may be a maximum number for each byte boundary. Implementing a bit carry may resolve the numerical value 10.0.0.302 to 10.0.1.46.

In some examples, offsets may be specified as an expression in all or a portion of an IP address generation formula. For example, a positive or negative offset may be specified which may define an increment for a next IP address. In this manner, a set of IP addresses may be generated which may not be specific to any particular computing node. A setup service described herein may accordingly assign any IP address in the set to any of the computing nodes in the system in some examples. One example of an IP address generation formula utilizing an offset may be:

$$10.5.4.10+5$$

Utilizing the above IP address generation formula, the setup service may generate a set of IP addresses including 10.5.4.10, 10.5.4.15, 10.5.4.20, etc. In some examples, when the increment results in crossing a byte boundary, the setup service may implement a bit carry such that, e.g., . . . 4.255 will wrap to . . . 5.4 with an increment of 5.

Examples of IP address generation formulas described herein in a context of IPv4 IP addresses may analogously be used in some examples of IPv6 IP addresses. Recall an IPv6 address includes 128 bits, written as a set of eight colon-delimited 16 bit hexadecimal numbers. For example: 2001:db8:85a3:0:0:8a2e:370:7334. IPv6 may also utilize a shorthand to compress zero elements. The shorthand may be a double colon that signifies a set of zero elements sufficiently long to bring the entire set to eight numbers. The above example, can be written as 2001:db8:85a3::8a2e:370:7334 using this shorthand. Note that the double colon can also be at the start or the end of the sequence.

Examples of setup services and/or expression engines described herein may support IPv6 IP addresses in some examples. In examples where the IP address generation formula may evaluate to a single numerical value which may be translated into an IP address, expression evaluation engines may be provided which support 128 bit numbers instead of just 32 bits which may be used for IPv4. The engine and service may process hexadecimal instead of decimal numbers. Moreover, hexadecimal numbers with a leading letter may be prefaced with a 0, e.g., 0adb8. In this manner, an IP address generation formula which may be used to generate IPv6 addresses may be written as:

$$2001db885a3<<0a0+(b<<10)+p$$

This may provide for the number 2001db885a3 to be shifted left 0a0 bits. The block value of a computing node may be shifted left 10 bits and added to the first shifted value. To this sum, the node position may be added. Resulting IP addresses may be assigned (e.g., by setup services described herein) to the associated computing node.

In examples where the IP address generation formula may include multiple expressions (e.g., an expression for each byte boundary), expression evaluation engines may be provided which support the generation of IPv6 IP addresses. For example, colons may be used instead of periods to input an indication of a word boundary and to provide word boundaries in generated IP addresses. Double colons may be utilized to generate a stretch of 0s in input expressions and/or generated IP addresses. Numbers may be hexadecimal instead of decimal, and hexadecimal numbers with a leading letter may be prefaced with a 0. In this manner, an IP address generation formula which may be used to generate IPv6 addresses may be written as:

2001:db8:85a3:0:0:8a2e:370+b*4:7000+p*2

In this manner, the value of a first byte boundary of a resulting IP address may be 2001. The value of the second byte boundary may be db8. The value of the third byte boundary is 85a3. The value of the fourth and fifth byte boundaries are 0. The value of the sixth byte boundary is 8a2e. The value of the seventh byte boundary is 370 added to the product of the block number and 4. The value of the eighth byte boundary is 7000 added to the product of the node position and 2. In this manner, an IP address generation formula may be used to generate IPv6 addresses. Resulting IP addresses may be assigned to the associated computing node at the block number and node position used to generate the IP address.

In examples where the IP address generation formula may include an expression providing an offset, expression evaluation engines may be provided which support the generation of IPv6 IP addresses. For example, an IPv6 address may be input (e.g., to a user interface described herein) and used as a base. The offset may be entered in hexadecimal. In this manner, an IP address generation formula which may be used to generate IPv6 addresses may be written as:

2001:db8:85a3::8a2e:370:7000+5

In this manner, the value of the first byte boundary of a resulting IP address may be 2001. The value of the second byte boundary may be db8. The value of the third byte boundary may be 85a3. The value of the fourth and fifth byte boundaries may be zero (e.g., as indicated by the double colon). The value of the sixth byte boundary may be 8a2e. The value of the seventh byte boundary may be 370. The value of the eighth byte boundary may be 7000+an increment of 5 between each IP address. Accordingly, a setup service described herein may generate a set of IPv6 IP addresses by incrementing the eighth byte boundary by 5 between each IP address, and implementing a bit carry in some examples. Resulting IP addresses may be assigned to computing nodes in systems described herein.

FIG. 2 is a schematic illustration of a user interface arranged in accordance with examples described herein. The user interface 200 may, for example, be used to implement the user interface 152 of FIG. 1. The user interface 200 may in some examples be displayed on a display of an admin system, such as admin system 150 of FIG. 1. The user interface 200 is generally in the form of a table and includes column 202 for block, column 204 for node, column 206 for IPMI IP address (e.g., BMC IP address), column 208 for hypervisor IP address, column 210 for CVM IP address, and column 212 for hypervisor hostname. Additional, fewer, and/or different columns may be used in other examples. The user interface 200 includes a row for entering IP address generation formulas—e.g., input area 214 may be used to enter an IP address generation formula for BMC IP addresses, input area 216 may be used to enter an IP address generation formula for hypervisor IP addresses, and input area 218 may be used to enter an IP address generation formula for CVM IP addresses. Each row of the table may specify a particular block—e.g., row 220 may be for a particular block (e.g., NX-3060 in the example of FIG. 2) and row 222 may be for a particular block (e.g., NX-6035C in the example of FIG. 2). Note that each block may have more than one node. For example, row 220 may include three nodes—e.g., node A, B, and C as shown in FIG. 2. Row 222 may include two nodes—e.g., node A and B as shown in FIG. 2. Additional, fewer, and/or different nodes and blocks may be used in other examples.

During operation, examples of setup services described herein may discover one or more computing nodes in a system. As shown in FIG. 2, five nodes were discovered, using a multicast technique. The five nodes are accordingly displayed on a user interface—e.g., in rows of the table of user interface 200.

A user may enter an IP address generation formula for each of a plurality of computing node components. For example, in FIG. 2, a user may enter a first formula in input area 214, a second formula in input area 216, and a third formula in input area 218. The first formula may be used to generate a set of IP addresses for BMCs in the system, the second formula may be used to generate a set of IP addresses for hypervisors in the system, and the third formula may be used to generate a set of IP addresses for CVMs in the system. The IP address generation formula may be entered, for example, by typing the formula into the relevant input area, or utilizing another input device to input the formula.

Examples of expression engines and/or setup services described herein may accordingly evaluate the formulas in input area 214, input area 216, and/or input area 218 to generate IP addresses for each component in each node. The generated IP addresses may be displayed in user interface 200 and may be associated with each computing node.

For example, expression evaluation engine 148 and/or setup service 146 of FIG. 1 may evaluate an IP address generation formula entered in input area 214. Any of a variety of IP address generation formulas may be used, and examples are described herein. The evaluation may yield a set of IP addresses. For example, evaluating the formula in input area 214 for node A of the block in row 220 may generate IP address #1, as shown in FIG. 2. Evaluating for node B of the block in row 220 may generate IP address #2, etc.

In this manner, a set of IP addresses generated in accordance with an IP address generation formula for multiple nodes may be displayed in association with the relevant nodes. A user may then review the IP addresses generated and their association with the nodes.

In some examples, a user may decide to delete a node, move a node, or otherwise change a configuration of nodes in a system. The user may input the change using a user interface described herein in some examples. For example, a user may delete a node by highlighting the node and deleting it, or by clicking on the appropriate "x" shown in FIG. 2, for example. A user may move a node by selecting it and dragging it to a new location in some examples.

Responsive to an indication of a deleted and/or changed node, examples of expression engines and/or setup services described herein may re-calculate the IP addresses in accordance with the IP address generation formulas. In this manner, the user interface may dynamically update as a user changes arrangements of nodes.

Accordingly, examples described herein may advantageously allow users to enter one or more IP address generation formulas. For example, the formulas may be entered in the form of parameterized spreadsheet-like formulas. Examples of graphical user interfaces described herein, such as user interface 152 of FIG. 1, may provide an entry location (e.g., a box or other indicator) for a user to enter one or more IP address generation formulas. In some examples, the box for IP address generation formula entry may be preceded by an "=" symbol, to aid the user in understanding that a formula may be entered.

Figure 3:
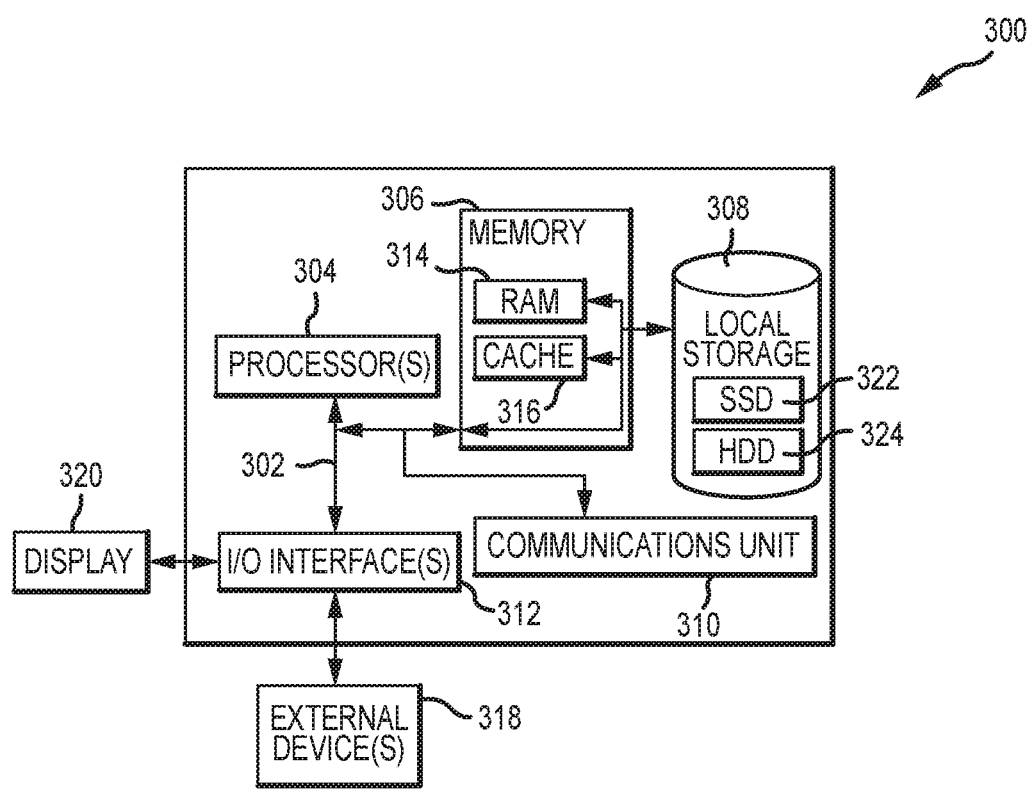
FIG. 3 depicts a block diagram of components of a computing node in accordance with examples described herein.

FIG. 3 depicts a block diagram of components of a computing node 300 in accordance with examples described herein. It should be appreciated that FIG. 3 provides only an illustration of one implementation and does not imply any limitations with regard to the environments in which different embodiments may be implemented. Many modifications to the depicted environment may be made. The computing node 300 may implemented as the computing node 102 and/or computing node 112 of FIG. 1.

The computing node 300 includes a communications fabric 302, which provides communications between one or more processor(s) 304, memory 306, local storage 308, communications unit 310, I/O interface(s) 312. The communications fabric 302 can be implemented with any architecture designed for passing data and/or control information between processors (such as microprocessors, communications and network processors, etc.), system memory, peripheral devices, and any other hardware components within a system. For example, the communications fabric 302 can be implemented with one or more buses.

The memory 306 and the local storage 308 are computer-readable storage media. In this embodiment, the memory 306 includes random access memory RAM 314 and cache 316. In general, the memory 306 can include any suitable volatile or non-volatile computer-readable storage media. The local storage 308 may be implemented as described above with respect to local storage 124 and/or local storage 130. In this embodiment, the local storage 308 includes an SSD 322 and an HDD 324, which may be implemented as described above with respect to SSD 126, SSD 132 and HDD 128, HDD 134 respectively.

Various computer instructions, programs, files, images, etc. may be stored in local storage 308 for execution by one or more of the respective processor(s) 304 via one or more memories of memory 306. In some examples, local storage 308 includes a magnetic HDD 324. Alternatively, or in addition to a magnetic hard disk drive, local storage 308 can include the SSD 322, a semiconductor storage device, a read-only memory (ROM), an erasable programmable read-only memory (EPROM), a flash memory, or any other computer-readable storage media that is capable of storing program instructions or digital information.

The media used by local storage 308 may also be removable. For example, a removable hard drive may be used for local storage 308. Other examples include optical and magnetic disks, thumb drives, and smart cards that are inserted into a drive for transfer onto another computer-readable storage medium that is also part of local storage 308.

Communications unit 310, in these examples, provides for communications with other data processing systems or devices. In these examples, communications unit 310 includes one or more network interface cards. Communications unit 310 may provide communications through the use of either or both physical and wireless communications links.

I/O interface(s) 312 allows for input and output of data with other devices that may be connected to computing node 300. For example, I/O interface(s) 312 may provide a connection to external device(s) 318 such as a keyboard, a keypad, a touch screen, and/or some other suitable input device. External device(s) 318 can also include portable computer-readable storage media such as, for example, thumb drives, portable optical or magnetic disks, and memory cards. Software and data used to practice embodiments of the present invention can be stored on such portable computer-readable storage media and can be loaded onto local storage 308 via I/O interface(s) 312. I/O interface(s) 312 also connect to a display 320.

Display 320 provides a mechanism to display data to a user and may be, for example, a computer monitor.

From the foregoing it will be appreciated that, although specific embodiments have been described herein for purposes of illustration, various modifications may be made while remaining with the scope of the claimed technology.

Examples described herein may refer to various components as "coupled" or signals or data as being "provided to" or "received from" certain components. It is to be understood that in some examples the components are directly coupled one to another, while in other examples the components are coupled with intervening components disposed between them. Similarly, signals and/or data may be provided directly to and/or received directly from the recited components without intervening components, but also may be provided to and/or received from the certain components through intervening components.

What is claimed is:

1. A method comprising:
   discovering, by a computing node, multiple computing nodes in a virtualization environment, the multiple computing nodes each comprising one or more computing node components;
   evaluating, by the computing node, each of a plurality of internet protocol (IP) address generation formulae received through a user interface for each of the multiple computing nodes in the virtualization environment, wherein each of the IP address generation formulae corresponds to a different one of the computing node components and each of the IP address generation formulae utilizes at least one computing node parameter, wherein evaluating the plurality of IP address generation formulae includes determining a value for the at least one computing node parameter for each of the IP address generation formulae to generate an IP address for each corresponding computing node component of the multiple computing nodes;
   displaying, through the user interface, the IP addresses for each computing node component of the multiple computing nodes; and
   imaging, by the computing node, each of the computing nodes in the virtualization environment, including assigning the multiple IP addresses to each corresponding computing node component of the multiple computing nodes in accordance with the plurality of IP address generation formulae.

2. The method of claim 1, wherein the different computing node components comprise an IP address for a controller virtual machine of the computing node, an IP address for a hypervisor of the computing node, and an IP address for a baseboard management controller (BMC) of the computing node.

3. The method of claim 1, further comprising:
   receiving, through the user interface, an indication of a change of an arrangement of the computing nodes to a changed arrangement; and
   re-evaluating one or more of the IP address generation formulae for the changed arrangement; and
   displaying updated IP addresses for the changed arrangement.

4. The method of claim 1, wherein one or more of the IP address generation formulae comprises an expression for each of a plurality of IP address byte boundaries.

5. The method of claim 1, wherein one or more of the IP address generation formulae comprises an expression including at least one of a bit shift operator or a mathematical operator.

6. The method of claim 1, wherein evaluating each of the plurality of IP address generation formulae results in a numerical value for each of the plurality of IP address generation formulae, the method further comprising converting each of the numerical values into a corresponding IP address.

7. At least one non-transitory computer-readable storage medium including instructions that when executed in a distributed computing system, cause the distributed computing system to:
receive, through a user interface of an administrator system of the distributed system, a plurality of IP (internet protocol) address generation formulae each utilizing at least one computing node parameter;
discover, by a computing node of the distributed computing system, multiple computing nodes in a virtualization environment, the multiple computing nodes each comprising one or more computing node components;
evaluate, by the computing node, each of a plurality of Internet protocol (IP) address generation formulae received through a user interface for each of the multiple computing nodes in the virtualization environment, wherein each of the IP address generation formulae corresponds to a different one of the computing node components and each of the IP address formulae utilizes at least one computing node parameter, wherein evaluating the plurality of IP address generation formulae includes determining a value for the at least one computing node parameter for each of the IP address generation formulae to generate an IP address for each corresponding computing node component of the multiple computing nodes;
display, through the user interface, the IP addresses for each computing node component of the multiple computing nodes; and
image, by the computing node, each of the computing nodes in the virtualization environment, including assigning the multiple IP addresses to each corresponding computing node component of the multiple computing nodes in accordance with the plurality of IP address generation formulae.

8. The at least one non-transitory computer-readable storage medium of claim 7, wherein the instructions further cause the computing node to:
display updated IP addresses for a changed arrangement responsive to receipt of an indication of the changed arrangement of the computing nodes through a user interface and a re-evaluation of one or more of the IP address generation formulae for the changed arrangement.

9. The at least one non-transitory computer-readable storage medium of claim 7, wherein one or more of the IP address generation formulae comprises an expression including at least one of a bit shift operator or a mathematical operator.

10. The at least one non-transitory computer-readable storage medium of claim 7, wherein evaluating each of the plurality of IP address generation formulae results in a numerical value for each of the plurality of IP address generation formulae.

11. A system comprising:
a storage pool comprising a plurality of storage devices;
an administrator system comprising a processor and memory implementing communication with the setup service, and a user interface; wherein the administrator system is configured to receive, through the user interface, a plurality of IP (internet protocol) address generation formulae, each utilizing at least one computing node parameter;
a computing node configured to form a portion of a virtualization environment comprising multiple computing nodes, each computing node comprising one or more computing node components, the computing node including a hypervisor and a plurality of user virtual machines, the plurality of, user virtual machines configured to access the plurality of storage devices, wherein each of the plurality of IP address generation formulae corresponds to a different computing node component, and the computing node further comprising a further processor and memory implementing:
a controller virtual machine configured to run on the computing node and manage access by the plurality of user virtual machines to the storage pool; and
a setup service provided by the controller virtual machine, wherein the setup service is configured to discover the multiple computing nodes in the virtualization environment and configure the multiple computing nodes by evaluating, using an expression evaluation engine included in the setup service, the plurality of IP address generation formulae to generate an IP address for each corresponding computing node component of the multiple compute nodes, and assigning each IP address to each corresponding computing node component.

12. The system of claim 11, wherein one or more of the plurality of IP address generation formulae includes a variable associated with each of the multiple computing nodes, and wherein the expression evaluation engine is configured to evaluate the variable for each of the multiple computing nodes.

13. The system of claim 12, wherein the variable comprises node position, block number, node number, rack ID, slot height, or combinations thereof.

14. The system of claim 11, wherein the administrator system is configured to display, using the user interface the set of IP addresses and graphically associate each IP address of the set of IP addresses with a computing node.

15. The system of claim 14, wherein the administrator system is configured to receive, through the user interface, an indication to delete one of the computing nodes, and wherein the setup service is further configured to revise an association between each IP address of the set of IP addresses and the computing nodes based on the indication to delete.

16. The system of claim 11, wherein a variable of the IP address generation formula is associated with a physical position of each of the multiple computing nodes.

17. The system of claim 11, wherein, for each computing node, the multiple IP addresses include an IP address for a controller virtual machine of the computing node, and IP address for a hypervisor of the computing node, and an IP address for a baseboard management controller (BMC) of the computing node.

18. The system of claim 17, wherein, for each computing node, the multiple IP addresses further include a second IP address for the controller virtual machine of the computing node for use in segregating network traffic.

19. The system of claim 11, wherein one or more of the plurality of IP address generation formulae comprise an expression for each of a plurality of IP address bit boundaries.

20. The system of claim 11, wherein one or more of the plurality of IP address generation formulae comprise an expression including at least one of a bit shift operator or a mathematical operator.

* * * * *